(12) United States Patent
Hawtof et al.

(10) Patent No.: US 6,598,425 B1
(45) Date of Patent: Jul. 29, 2003

(54) METHOD FOR COLLECTING SOOT (75) Inventors: Daniel W. Hawtof, Painted Post, NY (US); Joseph M. Whalen, Corning, NY (US)

(73) Assignee: Corning Incorporated, Corning, NY (US)

( * ) Notice: Subject to any disclaimer, the term of this patent is extended or adjusted under 35 U.S.C. 154(b) by 268 days.

(21) Appl. No.: 09/718,060

(22) Filed: Nov. 20, 2000

Related U.S. Application Data (60) Provisional application No. 60/187,755, filed on Mar. 8, 2000.

(51) Int. Cl.[7] .............................. C03B 19/06
(52) U.S. Cl. .................. 65/17.4; 65/397; 65/413; 65/421; 65/425; 65/529; 65/531; 427/472; 427/473; 427/474; 427/547; 427/550; 427/567; 427/598
(58) Field of Search ................ 65/17.4, 413, 421, 65/425, 397, 529, 531; 427/472, 473, 474, 547, 550, 567, 598

(56) References Cited

U.S. PATENT DOCUMENTS

| | | | |
|---|---|---|---|
| 3,607,322 A | | 9/1971 | Brady et al. |
| 3,784,386 A | | 1/1974 | Araujo et al. |
| 3,824,923 A | * | 7/1974 | Fisher et al. |
| 4,367,013 A | * | 1/1983 | Guerder et al. ............... 65/397 |
| 4,465,708 A | | 8/1984 | Fanucci et al. |
| 4,968,339 A | | 11/1990 | Miller et al. |
| 5,043,002 A | | 8/1991 | Dobbins et al. |
| 5,152,819 A | | 10/1992 | Blackwell et al. |
| 6,003,342 A | | 12/1999 | Ishida et al. |
| 6,099,698 A | | 8/2000 | Hatakeyama et al. |

* cited by examiner

*Primary Examiner*—Michael Colaianni
(74) *Attorney, Agent, or Firm*—James V. Suggs (57) ABSTRACT

A method and apparatus for manufacturing optical components. A burner generates soot, and a surface area collector collects the soot. The burner is disposed such that the soot collected within the surface area collector is substantially not reheated by subsequently deposited soot. Magnetic forces direct the soot to desired location(s) within the surface area collector. The surface area collector operates at relatively low temperatures sufficient to retain rather volatile substances, such as fluorine, in the soot.

26 Claims, 10 Drawing Sheets

FIG. 9  CONVEYOR BELT / MOVABLE FLOOR TO SOOT COLLECTOR AND SINTERING OVEN

METHOD FOR COLLECTING SOOT

CROSS-REFERENCE TO RELATED APPLICATIONS

This is a continuation of U.S. Provisional Patent Application Serial No. 60/187,755 filed on Mar. 8, 2000, the content of which is relied upon and incorporated herein by reference in its entirety, and the benefit of priority under 35 U.S.C. § 119(e) is hereby claimed.

BACKGROUND OF THE INVENTION

1. Field of the Invention

The present invention is generally related to manufacturing optical waveguides, components, and products, and more particularly to an apparatus and method to collect soot for use in manufacturing the same.

2. Technical Background

Optical component manufacturing experiences great difficulties with attenuation in its glass melts. This is at least partially due to the difficulty and expense in obtaining batch materials of sufficient purity. A need presently exists to produce and collect soot produced by waveguide burners, which is intrinsically of a higher purity. Not only is the purity issue a source of difficulty, but also is the ability to dope optical components with fluorine.

Fluorine doping is important in certain components since fluorine lowers the index of refraction in certain optical component profiles. Examples of optical components that require "down" doping (for a lower index of refraction) include large effective area fibers. Another critical use of fluorine doping is in multi-component glasses used for amplification in fiber systems. In at least both of these cases, delivering and retaining fluorine in the glass has proven extremely difficult especially to do so at higher levels.

A reason for the difficulty in retaining fluorine at higher levels is due to, but not limited to, the relatively higher temperatures at which the prior approaches operate. Prior art approaches include such techniques as having a 2000° C. flame substantially proximate to the deposition which tends to bake out or at least substantially lower the fluorine content in the deposited material. The higher operating temperatures of the prior art approaches tend to vaporize the fluorine from the soot.

SUMMARY OF THE INVENTION

The present invention overcomes the aforementioned disadvantages as well as others. In accordance with the teachings of the present invention, a method and apparatus is provided for manufacturing optical components. In one aspect of the present invention, a surface area collector has a plurality of collection surfaces arranged to form a chamber where one of the surfaces has an aperture. A burner is in communication with the aperture and disposed such that the soot collected in the chamber is substantially unaffected by subsequently deposited soot. The chamber operates at relatively low temperatures sufficient to retain rather volatile substances, such as fluorine, in the soot. Thus, the lower temperature environment of the surface area collector has substantial advantages versus a 2000° C. environment of the prior art.

In another aspect of the present invention, a burner generates soot that is received by a substrate. At least one magnetic force generator directs the soot to be deposited on the substrate. In this way, a more efficient deposition is achieved.

Additional features and advantages of the invention will be set forth in the detailed description which follows, and in part will be readily apparent to those skilled in the art from that description or recognized by practicing the invention as described in the detailed description which follows, the claims, as well as the appended drawings.

It is to be understood that both of the foregoing general description and the following detailed description are merely exemplary of the invention, and are intended to provide an overview of framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals are used throughout the drawings to refer to the same or like parts.

Figure 1:
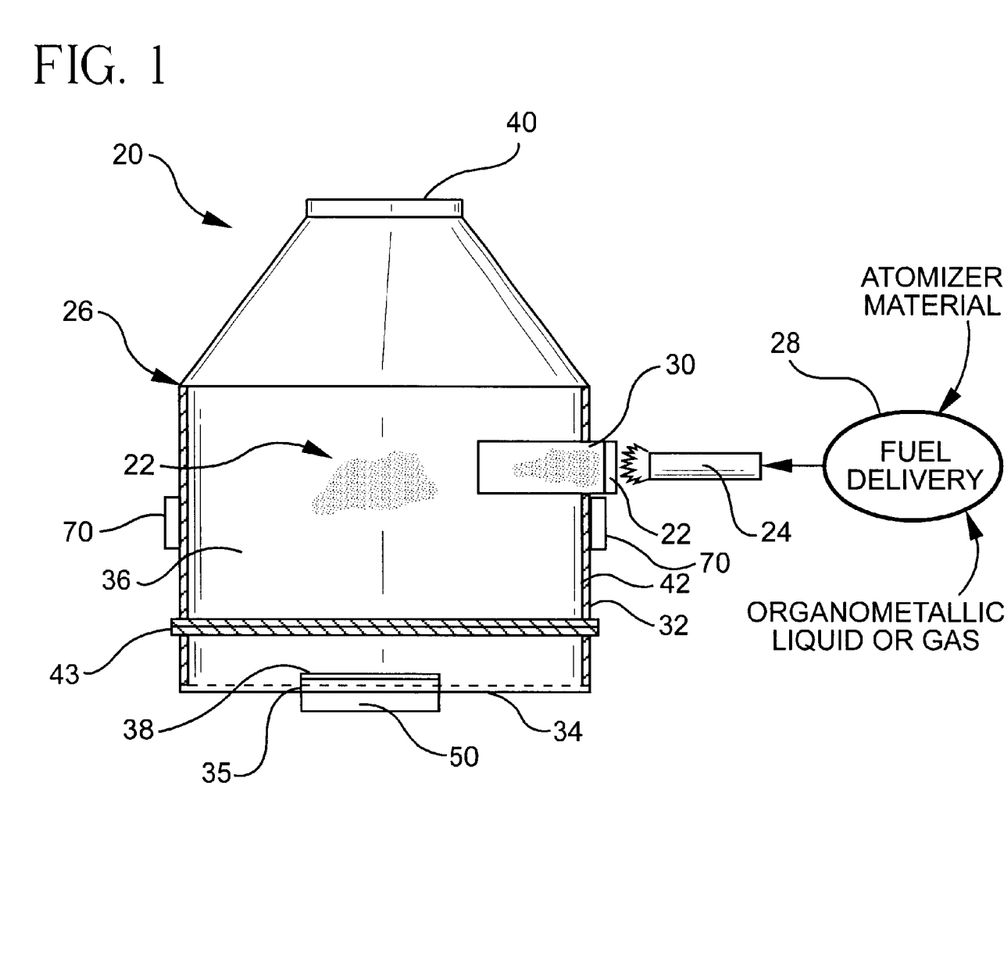
FIG. 1 is a side view of the preferred components of the present invention for producing and collecting soot wherein magnets for assisting the collection of soot are disposed outside the present invention's surface area collector.

An exemplary embodiment of the present invention is shown in FIG. 1. FIG. 1 depicts an apparatus 20 to produce and collect soot 22 for glass melting manufacturing of such optical components as, but not limited to, optical fibers and multi-component glasses used for amplification in fiber systems. The apparatus 20 includes a waveguide burner 24 and a surface area collector 26.

Waveguide burner 24 preferably uses a fuel/liquid delivery system 28 in order to produce soot particles 22 (i.e., particulate material). Organometallic liquid precursors are pumped to waveguide burner with an atomizing gas composed of a mixture of $CF_4$ and nitrogen or $CF_4$ and oxygen or other like gases (such as perfluoro compounds). Precursors are reacted in the burner. An exemplary organometallic liquid for the present invention includes octamethylcyclotetrasiloxane (OMCTS) $Si_4O_4C_8H_{24}$. The $CF_4$—$N_2$ mixture atomizes the organometallic liquid precursor and provides the source of fluorine in the soot.

The precursor fuel of the present invention includes using fluorine, germanium, titania, alumina, phosphorus, rare earth elements, sulfur, zirconium, and combinations thereof. The precursor fuel may also include metal, metal oxides, non-metal oxides, and combinations thereof.

Waveguide burner 24 of the present invention burns liquids directly and does not require materials to be vaporized before being burned in a waveguide burner as is done in prior art approaches. The prior art approaches achieve around 3 weight percent fluorine whereas the present invention achieves around 15 weight percent fluorine. Moreover, the present invention is not limited to only using fluorine, but also is applicable to using any substance, especially those substances that are undesirable to place in a vapor phase, and are rather volatile at relatively higher temperatures. As a non-limiting example, the present invention also generates and deposits soot containing relatively high concentrations of $GeO_2$ dopant. Moreover, the present invention includes not only the use of a single burner, but using multiple burners with a collector sufficiently large enough to process the substrates from the multiple burners.

The waveguide burner technique produces soot which is intrinsically of a higher purity than batch melts. Multicomponent soots produced in waveguide burner 24 are more intimately mixed, and of a smaller particle size than most batch materials purchased for melting process. As a result, waveguide soots melt at lower temperatures, and produce more homogenous cord-free glasses. This is especially advantageous for viscous, high melting glasses, such as the alkali-antimony-alumino-silicates used as optical amplifier materials. In this application, waveguide burner 24 is fed alkoxide solutions as precursors in order to produce the alkali-antimony-alumino-silicates.

Soot 22 is preferably directed at the tangent of surface area collector 26 through an opening or aperture 30. The soot rotates and swirls around surface area collector 26 and collects upon the walls 32 and/or floor 34 and/or substrate 35 in chamber 36 depending upon the desired collection approach as discussed below. The soot particles 22 acquire a charge as they rotate and swirl around chamber 36 and are deposited upon the walls 32 and/or floor 34 and/or substrate 35.As an example, soot 22 is deposited upon substrate 35 as shown by reference numeral 38.The top of chamber 36 includes a fume exhaust 40 in order to exhaust excess gases from the chamber and to adjust the soot capture rate.

Soot 22 is extracted after a period of time when chamber 36 has sufficiently cooled. Flange 43 depicts where the upper portion of surface area collector 26 detaches from the lower portion of surface area collector 26 in order to extract the collected soot. To aid in soot removal and reduce the possibility contamination, the inside of chamber 36 in one embodiment contains a heat resistant coating 42 that is compatible with the materials being collected. Collector 26 includes, but is not limited to, being made of silica so that metallic contamination from the collector is eliminated. However, it is to be understood that the present invention includes using other chemically inert and heat resistant materials, such as, but not limited to, quartz.

Surface area collector 26 in this embodiment as well as with other embodiments includes a water cooled shell/jacket (not shown) that encircles the outside diameter of chamber 36. Water cooled shell enhances the thermophoresis and capture efficiency of the surface area collector 26. Due at least to the enhanced thermophoresis, surface area collector 26 collects soot 22 in a substantially uniform manner on its walls 32 and floor 34.Thermophoresis is the process by which particles move in a temperature gradient from hot regions to cooler regions.

The operating temperature of the surface area collector 26 is typically around 300° C. and thus does not bake out the fluorine from the soot 22 as do the prior art approaches since the prior art approaches operate at a much higher temperature. Prior art approaches include such techniques as having a 2000° C. flame substantially adjacent to the deposition which tends to bake out or at least substantially lower the fluorine content in the deposited material. Thus, the approach of collecting the deposit in a 300° C. environment 36 that is removed from where burner 24 is located has decided advantages since the soot is not substantially reheated by subsequently deposited soot. Preferably, the collector environment is about two feet removed from the burner location. However, this distance is only an exemplary distance as other distances will achieve the effect of the present invention as it is dependent upon the application at hand. Such exemplary non-limiting distances include six, twelve, eighteen inches and greater between the flame of the burner and where the soot is deposited within the chamber of the surface area collector. This environment has substantial advantages versus a 2000° C. environment since it helps in part to improve the amount of fluorine retained in the deposited material. It should be understood that the present invention is not limited to operating around a 300° C. temperature, but includes collecting soot from a burner at a distance that allows the soot not to be reheated.

The present invention includes placing substrate 35 within chamber 36.In the preferred embodiment, electromagnetic and/or electrostatic forces guide soot particles 22 onto substrate 35 so that substantially uniform layers of the doped soot particles 22 deposit upon substrate 35. In the preferred embodiment, magnets 50 are placed proximate to substrate 35. In the case of using permanent magnets as magnets 50, preferably the north side of the magnet is more proximate to substrate 35 than the south side of the magnet. However, it should be understood that the present invention also includes utilizing electro-magnetic fields as generated by motors in order to direct the soot to be deposited in predetermined locations.

In the embodiments of the present invention that place electromagnetic and/or electrostatic force generators (e.g., magnets) outside of the surface area collector, it is preferable to have the walls of the surface collector such that the walls do not substantially interfere with the electromagnetic and/or electrostatic forces affecting the deposition of the soot. For example, the walls may be made of glass, aluminum, non-magnetic stainless steels, or high temperature plastics.

EXAMPLE

As one non-limiting exemplary application, waveguide burner 24 produced silicon dioxide soot 22 for surface area collector 26 for 65 minutes. Substrate 35 was a silica wafer. Surface area collector 26 was made of quartz glass. Permanent magnets 50 made of a ferrous material with its north side proximate to substrate 35 were used to deposit a substantially uniform film of silicon dioxide soot on substrate 35. It is to be understood that the present invention includes using any non-ferrous material as substrate 35, such as, but not limited to, silica, silicon, and cellular polystyrene which is available from Rimco Plastics located in Big Flats, N.Y.

Figure 2:
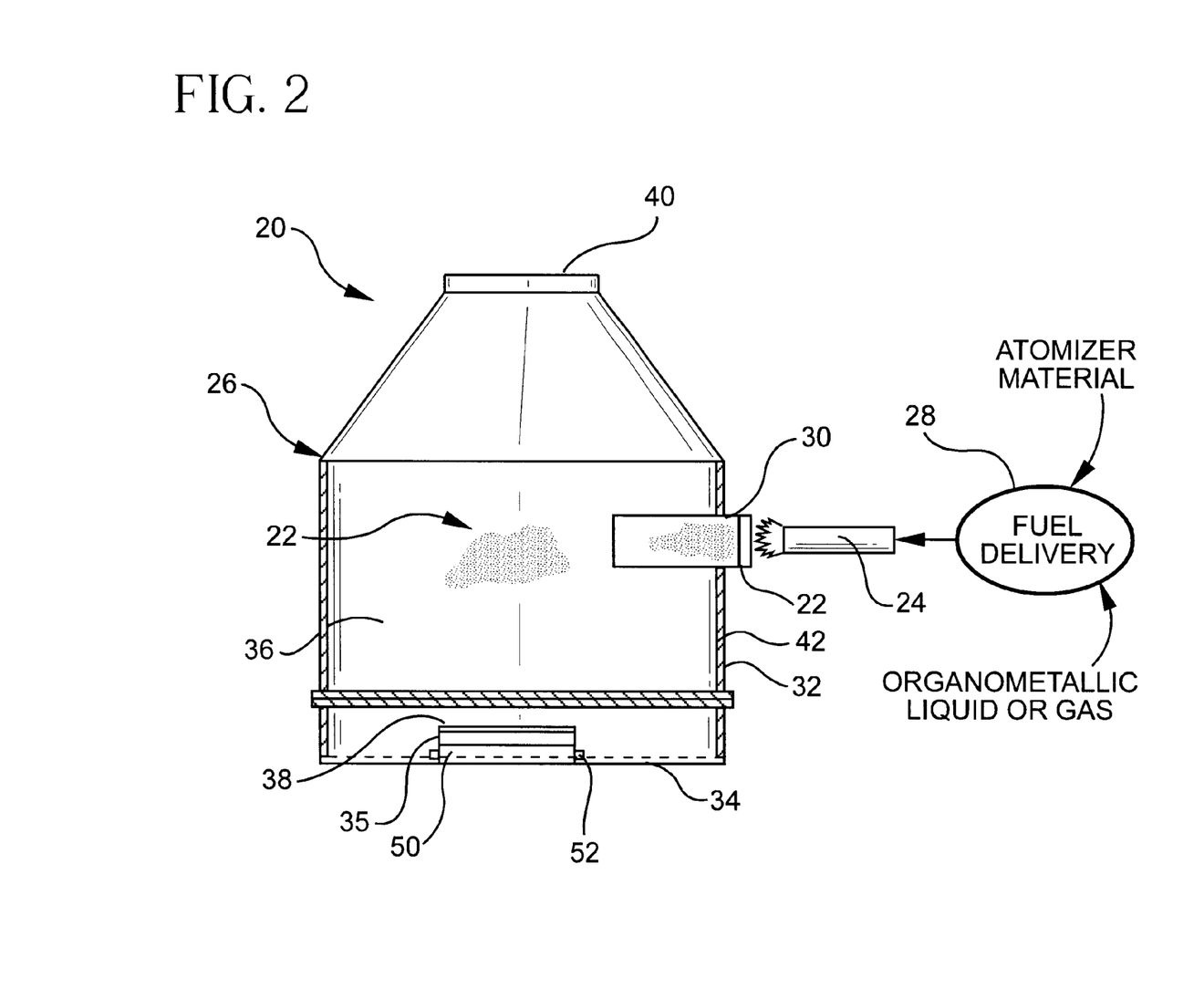
FIG. 2 is a side view of soot producing and collecting components of an alternate embodiment wherein magnets for assisting the collection of soot are disposed within the surface area collector.
Figure 3:
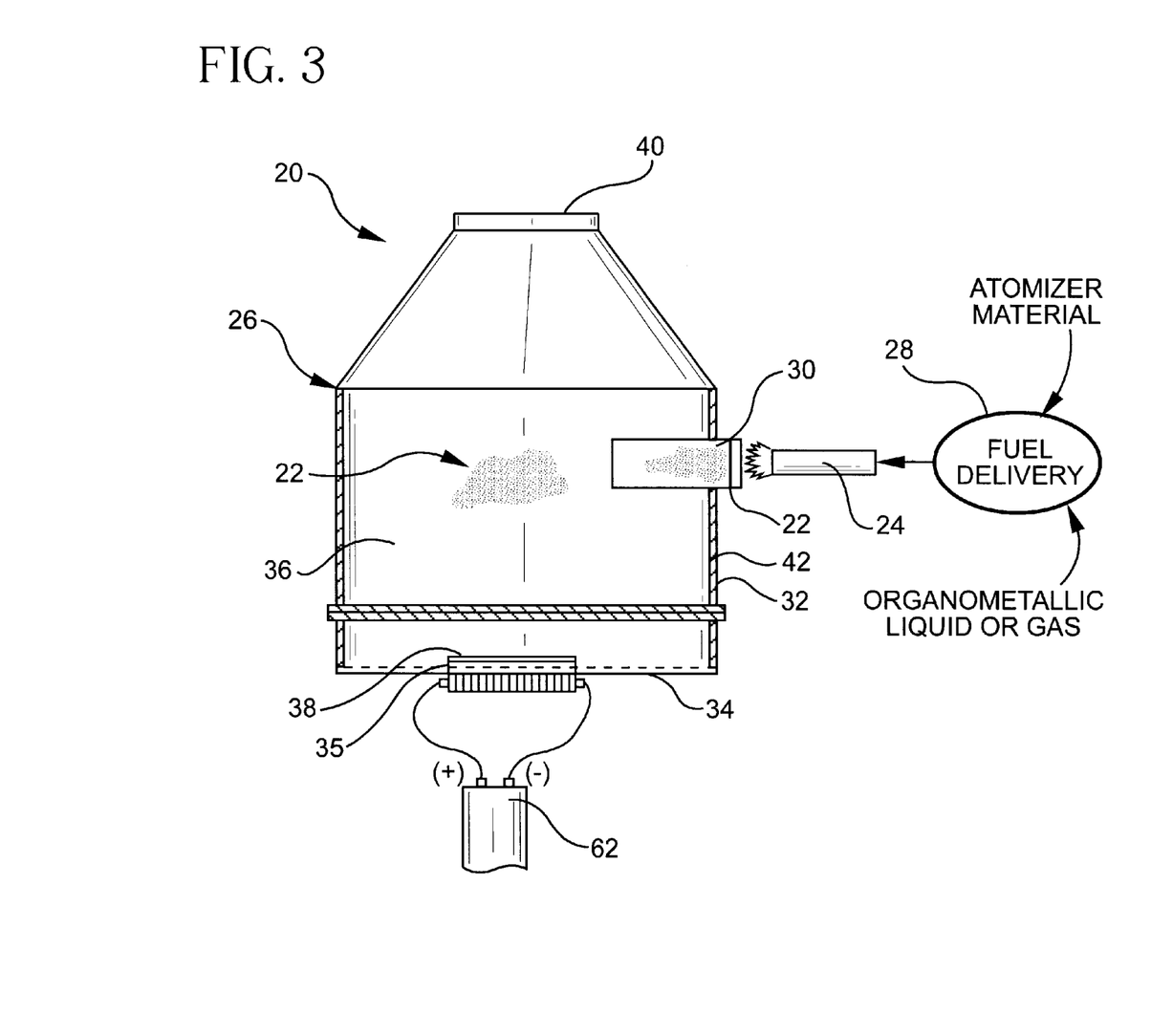
FIG. 3 is a side view of soot producing and collecting components of an alternate embodiment wherein an electromagnet is used for assisting the collection of soot.

In the preferred embodiment, magnets 50 are kept cooled so as to maintain their magnetism. One approach to maintaining the magnets relatively cool includes placing magnets 50 outside of the chamber 36 that contains substrate 35 and thus maintaining magnets 50 approximately at room temperature. Another approach includes placing magnets 50 inside chamber 36 but providing a cooling mechanism 52 for the magnets as shown in FIG. 2. Still another approach includes utilizing an electromagnet 60 wherein a ferrous core is wrapped with a wire that carries a current as shown in FIG. 3. Battery 62 supplies direct current to electromagnet 60.

Any of the magnet approaches also preferably utilize orienting additional magnets 70 around the outside wall such that magnetic lines of force would generally force soot particles 22 toward substrate 35 and keep particles 22 from adhering to walls 32 of surface area collector 26. Such a configuration of additional magnets along the walls of the surface area collector is to arrange the magnets around the chamber in order to repel the surface charge of the soot particles. In one embodiment, the present invention includes orienting the magnets such that the walls were in contact with all of magnets' North pole. Another embodiment includes alternating the magnets' poles such that every other magnet's pole in contact with the wall is North. It is to be understood that the present invention is not limited to only these approaches, but includes other approaches that provide a magnetic and/or electrostatic force which can influence soot to be deposited upon a substrate.

Figure 4:
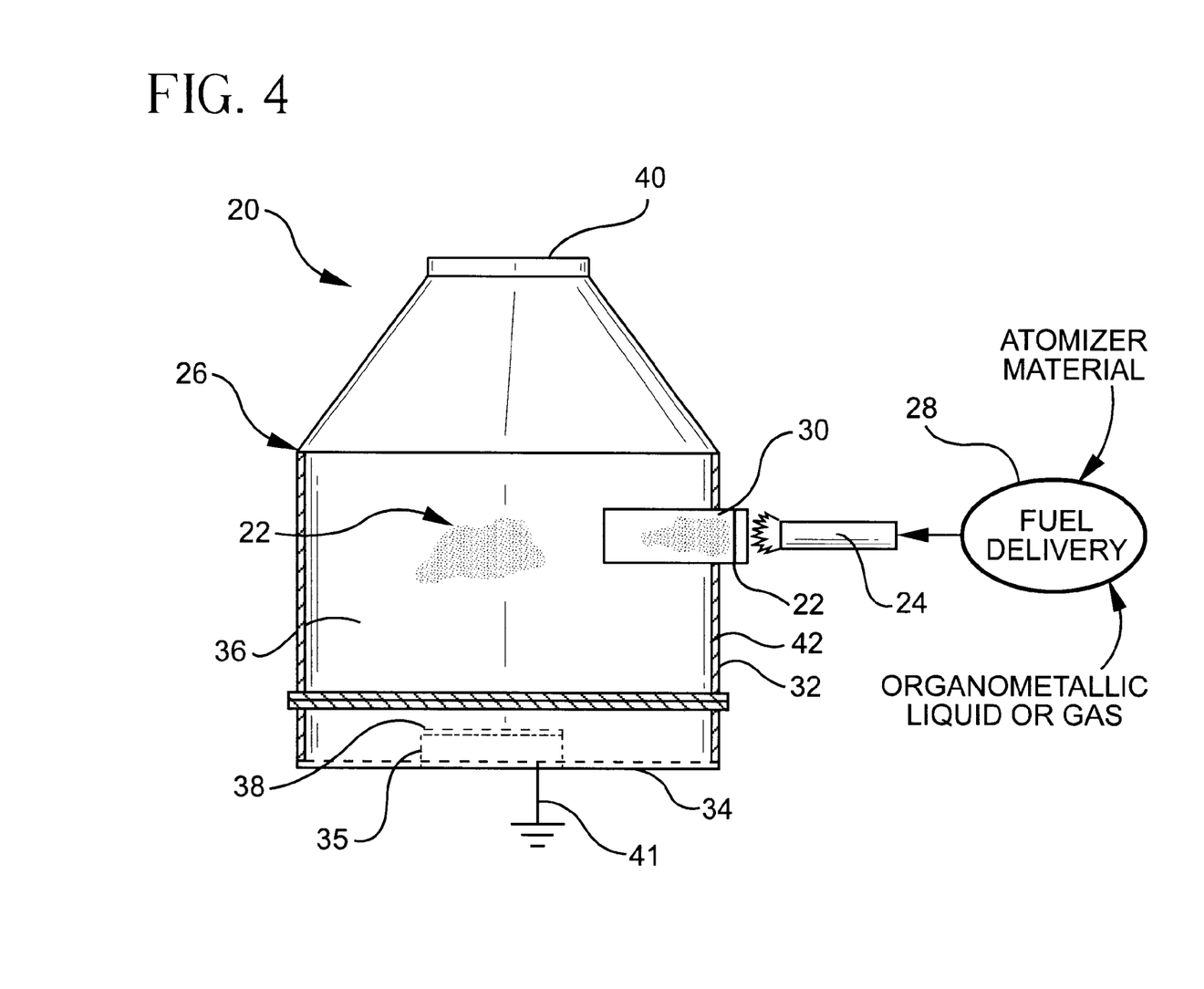
FIG. 4 is a side view of soot producing and collecting components of an alternate embodiment without the use of magnets for assisting the collection of soot.

FIG. 4 depicts the present invention in one embodiment without magnets or without a substrate. Surface area collector 26 is made of either glass or steel. Soot 22 rotates around chamber 36 and collects upon walls 32 and floor 34 in chamber 36. Soot 22 is extracted for further processing (including bulk melting) when chamber 36 has cooled and disassembled. Still another embodiment includes placing substrate 35 (shown in phantom in FIG. 4) within chamber 36 and grounding substrate 35. Soot particles 22 acquire a charge as they rotate around chamber 36 and are deposited upon substrate 35 as particles 22 are attracted to grounded substrate 35. A way for grounding substrate 35 includes hardwiring the apparatus to the earth or battery casing as depicted by reference numeral 41.

Figure 5:
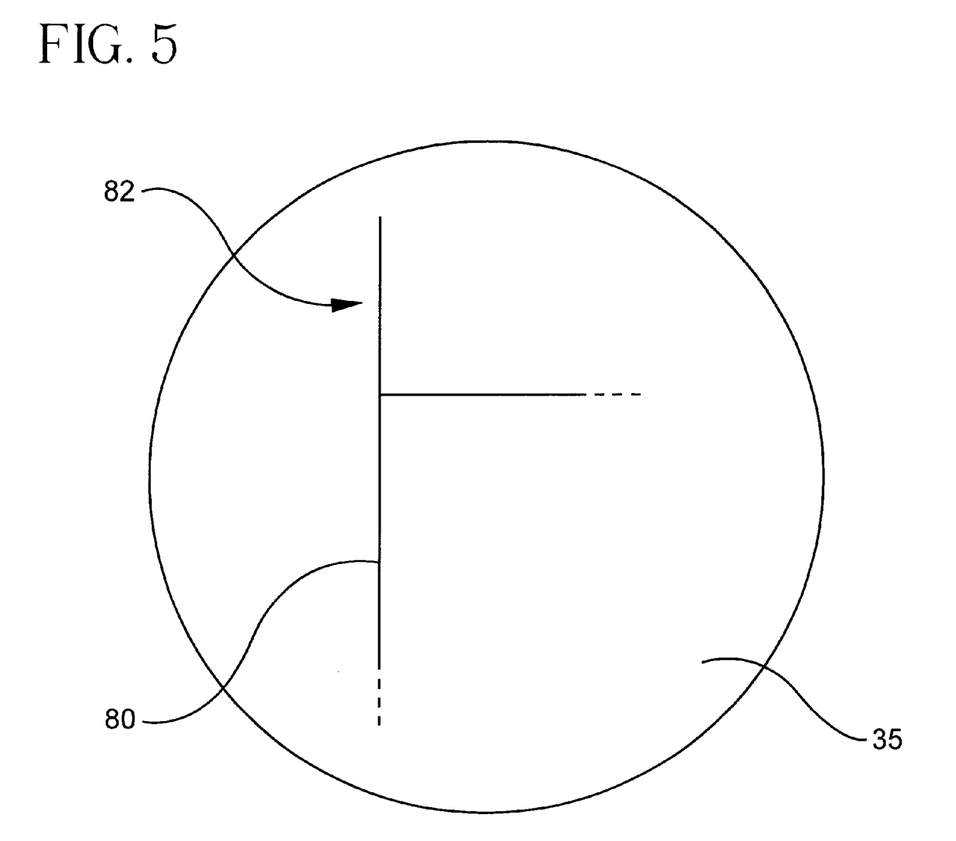
FIG. 5 is a top view of a substrate with conductive materials for depositing soot upon the conductive materials.

FIG. 5 depicts an embodiment of substrate 35 wherein a lightwave optical component circuit is created on substrate 35. First, conductive materials 80 are deposited in the pattern 82 of a desired lightwave optical component circuit. Substrate 35 with circuit pattern 82 is placed in the surface area collector and charged. The charged circuit pattern 82 attracts the soot such that the soot is deposited at least substantially on the charged circuit pattern. This approach produces an optical pathway without requiring masking and etching processes to create the pathway.

Figure 6A:
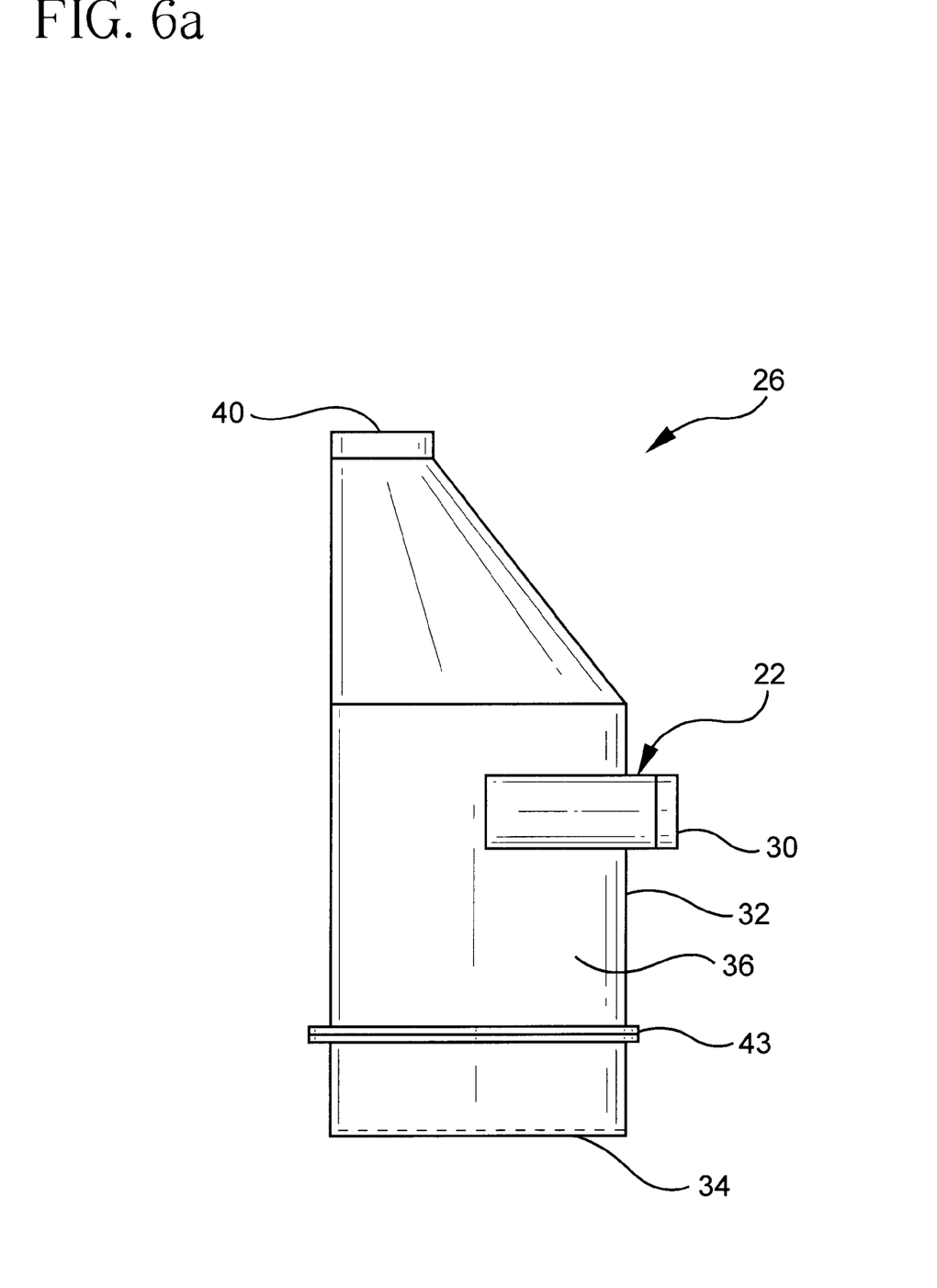
FIGS. 6a–6c depict views of an alternate embodiment of the surface area collector.
Figure 6B:
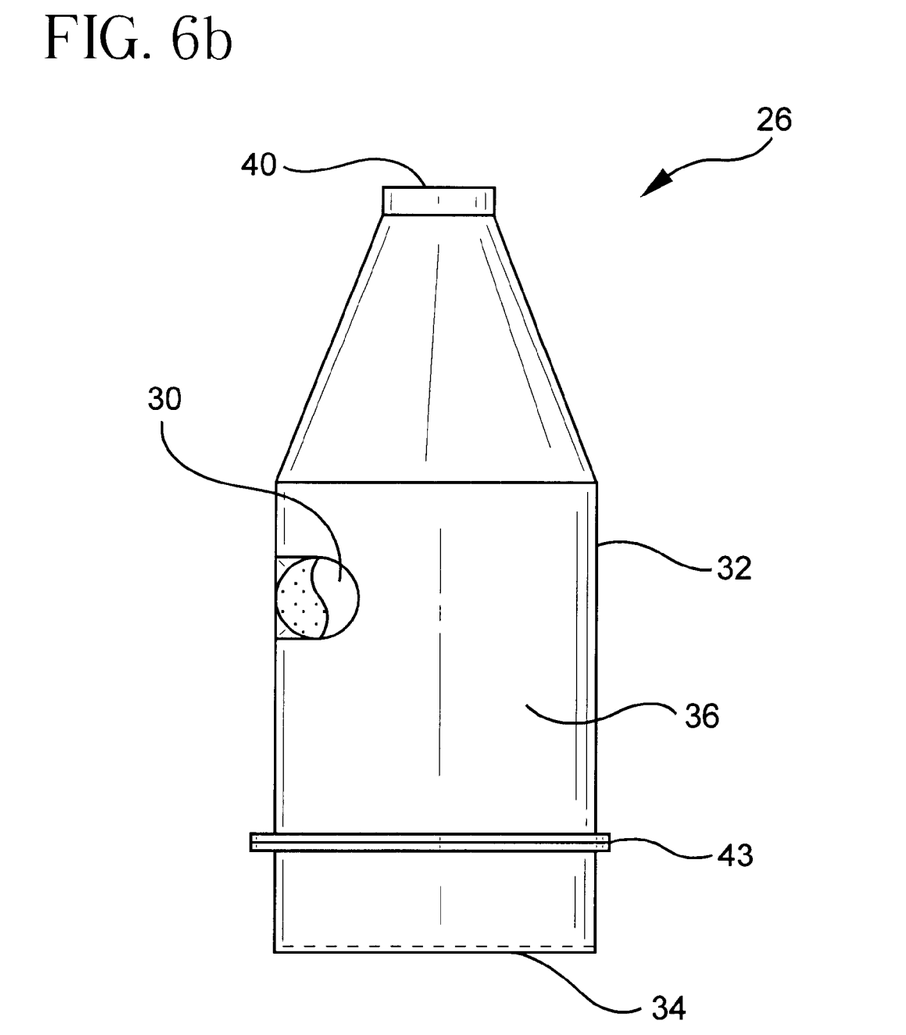
Figure 6C:
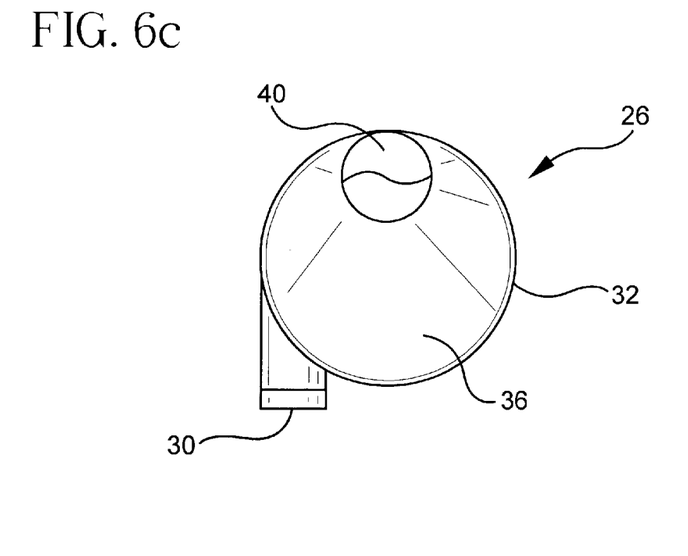

FIGS. 6a, 6b, and 6c depict respectively a side view, front view, and top view of an alternate embodiment of the present invention's surface area collector 26. With reference to FIGS. 6a, 6b, and 6c, soot 22 enters surface area collector 26 through an aperture, such as opening 30. Soot 22 swirls within chamber 36 and collects upon the surfaces of surface area collector 26 such as wall 32 and/or floor 34. This alternate embodiment also includes the use of magnets (not shown) and similar methods to direct soot to deposit upon a substrate (not shown). The top of chamber 36 includes a fume exhaust 40.

In general, surface area collector 26 captures soot for such uses as (but not limited to) glass melting. Surface area collector 26 is designed to fit into existing lathe equipment. Either liquid delivery or conventional vapor delivery burners are able to be used with surface area collector 26. The burners interface with surface area collector 26 via opening 30.

Figure 7:
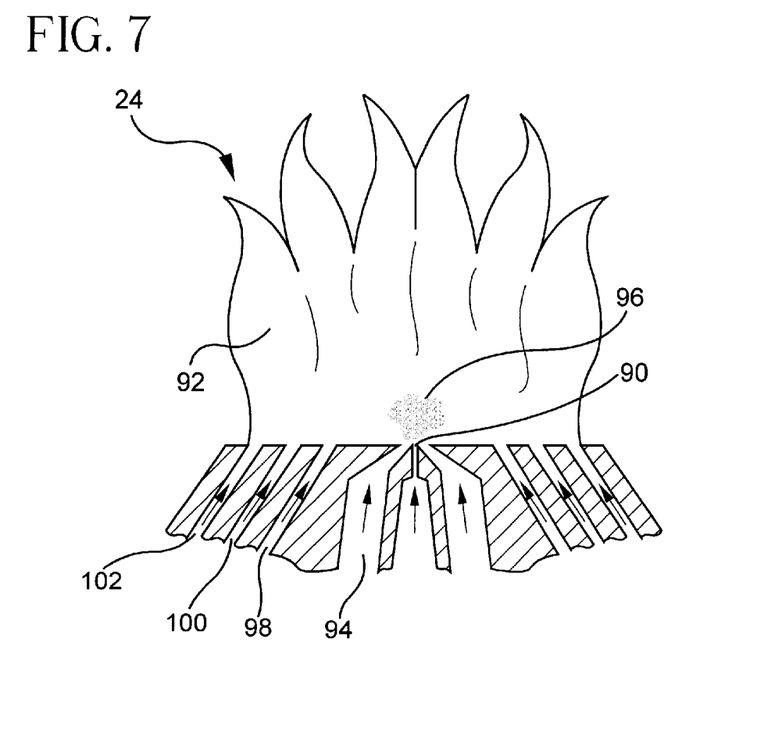
FIG. 7 is a side view of the waveguide burner of the present invention.

FIG. 7 depicts a cross-sectional view of burner 24. Burner 24 incorporates within its structure atomizer 90 which injects very finely atomized liquid reactant particles into flame 92. Soot is produced by combustion of the liquid reactant and collected by the surface area collector (not shown).

As shown by FIG. 7, burner 24 includes a series of concentric channels surrounding atomizer 90. Oxygen is delivered to flame 92 through channels 98 and 100. A premix of oxygen and a fuel such as methane is conducted to the flame through outermost channel 102.

Channel 94 contains a mixture of $CF_4$ and $N_2$. The $CF_4$—$N_2$ mixture atomizes the organometallic liquid precursor into particles which is burned in the flame of the burner. The $CF_4$—$N_2$ atomizing mixture provides the source of fluorine in the soot. Mixtures other than $CF_4$ may be used, such as $SF_6$.

The atomizing mixture is varied in order to vary the amount of fluorine in the soot. The present invention is able to manipulate and retain the level of fluorine in the soot as shown by the following table:

| | Component | First Example | Second Example | Third Example |
|---|---|---|---|---|
| K by FES | $K_2O$ | 14.0 Wt % | 10.3 Wt % | 9.3 Wt % |
| Al by ICP/DCP | $Al_2O_3$ | 13.8 Wt % | 9.1 Wt % | 7.9 Wt % |
| Er by ICP/DCP | $Er_2O_3$ | 0.6 Wt % | 0.4 Wt % | 0.3 Wt % |
| Sb by ICP/DCP | $SB_2O_3$ | 50.6 Wt % | 52.7 Wt % | 48.9 Wt % |
| Si by ICP/DCP | $SiO_2$ | 6.0 Wt % | 17.4 Wt % | 25.5 Wt % |
| F by Pyrohydrolysis | F | 15.2 Wt % | 6.1 Wt % | 3.3 Wt % |

In the above table, the term "FES" refers to flame emission spectroscopy. The term "ICP" refers to inductively coupled plasma. The term "DCP refers to direct current plasma.

Figure 8:
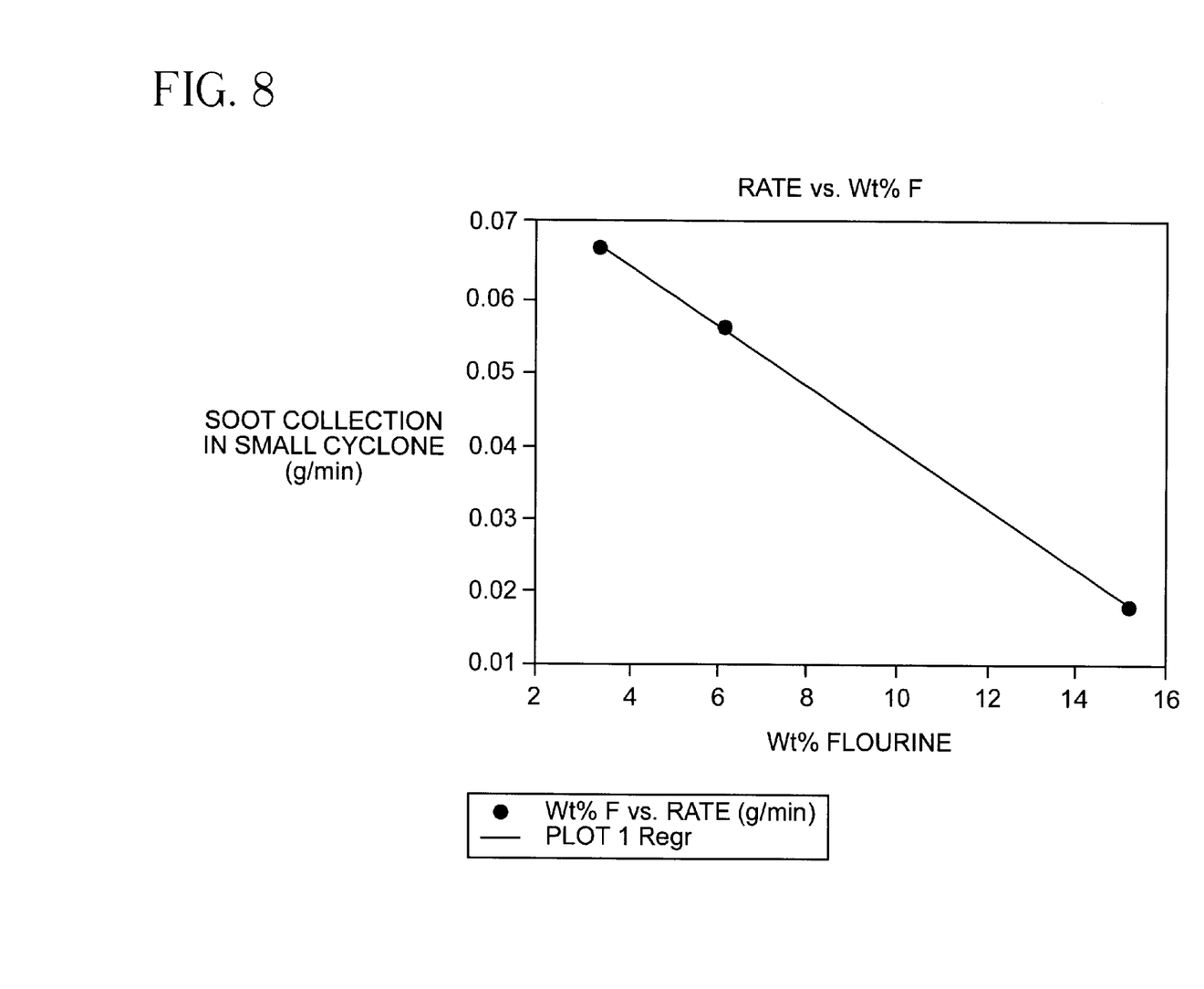
FIG. 8 is an x-y graph depicting the interrelationship between the soot collection in the surface area collector and the fluorine weight percentage that is deposited.

FIG. 8 depicts the interrelationship between the soot collection in the surface area collector and the fluorine weight percentage that is deposited. The graph illustrates that the soot collection decreases as the fluorine weight percentage increases. Moreover, an increase in $CF_4$ flow rate serves to increase the fluorine weight percentage that is deposited in the surface area collector. However, an increase in $CF_4$ flow rate serves to decrease the collection rate of the surface area collector. Moreover, collection efficiency is increased when the volume of the surface area collector is increased. For example, a surface area collector with a 0.8 $m^3$ volume exhibited a 3% efficiency in soot collection; a surface area collector with a 50 $m^3$ volume exhibited a 50% efficiency.

Figure 9:
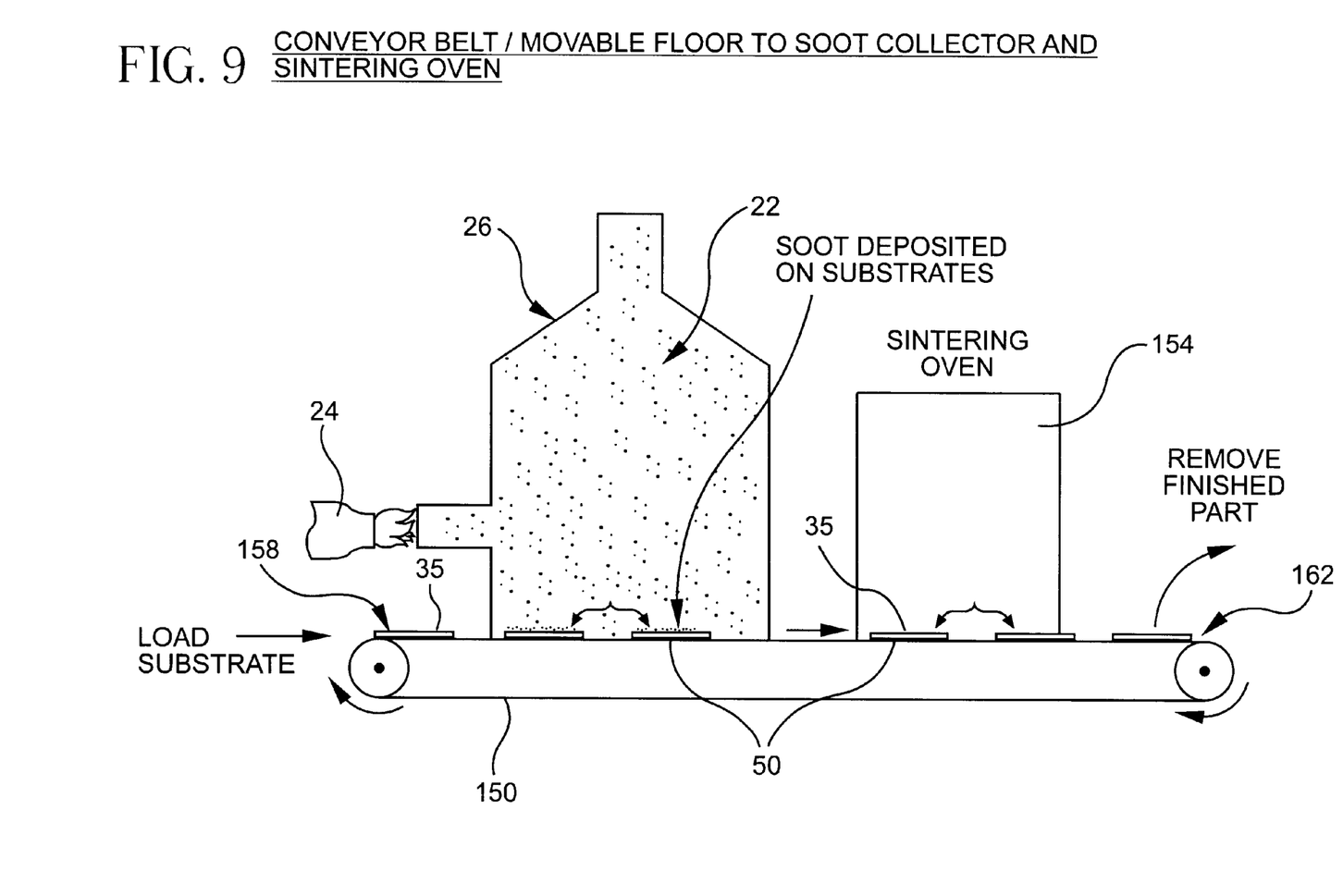
FIG. 9 is a side view of an alternate embodiment of the present invention wherein a conveying system conveys substrates through a surface collector and a sintering oven.

FIG. 9 depicts an alternate embodiment of the present invention for efficiently processing multiple substrates (e.g., planar substrates) according to the teachings of the present invention. A conveying system 150 conveys substrates 35 through surface area collector 26 and a sintering oven 154. Substrates 35 are loaded at the upstream end 158 of conveying system 150 so that substrates 35 can enter surface area collector 26. Within surface area collector 26 soot generated by burner 24 is deposited on the substrates 35 according to the teachings of the present invention.

Within the alternate embodiment, magnets 50 are placed proximate to substrates 35. FIG. 10 depicts magnets 50 placed under the conveying belt. The conveying belt is made of a material that allows for the magnetic forces to affect the deposition of the soot. However, it is to be understood that the present invention is not limited to this orientation of the magnets, but includes such orientations that allow for the magnets to affect the deposition while allowing the conveying system to convey the substrates.

Substrates 35 remain within surface area collector 26 for an amount of time that allows a sufficient deposition to form upon substrates 35. After a sufficient deposition has occurred, conveyor system 150 conveys substrates 35 to sintering oven 154 so that the soot deposition on substrates 35 can be sintered. After sintering of the deposition has occurred, conveyor system 150 conveys substrates 35 from sintering oven 154 to the downstream end 162 where the finished parts are removed.

While the present invention has been described in its presently preferred form, it is to be understood that there are numerous applications and implementations for the present invention. For example, the present invention also includes placing within the chamber of the surface area collector a plurality of rods. Soot collects upon rods which preferably are spaced about one inch apart and whose diameter is about one inch. As another example, the present invention includes such uses as, but not limited to: producing soot for melting in amplifier fiber processing; and telecommunications fibers that require a centerline index depression. In these fibers, the centerline of the soot core blank could be filled with fluorine doped soot as a means of introducing fluorine to the core blank. Accordingly, the invention is capable of modification and changes without departing from the spirit of the invention as set forth in the appended claims.

What is claimed is:

1. A method for manufacturing soot used in fabricating an optical component, the method comprising the steps of:
   generating the soot via a burner having a flame that produces heat, the burner having a temperature of greater than 1000° C. associated therewith;
   collecting the soot at a surface within a surface area collector, the surface having a temperature of less than 500° C. associated therewith.

2. The method of claim 1 the soot is generated by directly burning at least a liquid material.

3. The method of claim 1 further comprising the step of:
   delivering fuel to the burner in order to generate the soot, said fuel being selected from the group consisting of fluorine, germanium, titania, alumina, phosphorus, rare earth elements, and combinations thereof.

4. The method of claim 1 further comprising the step of:
   delivering a liquid fuel to the burner in order to generate the soot and for delivering atomizing air for atomizing the liquid fuel into the soot.

5. The method of claim 1 further comprising the step of:
   delivering a fuel as a vapor to the burner in order to generate the soot.

6. The method of claim 1 further comprising the step of:
   delivering fuel to the burner in order to generate the soot, said fuel including fluorine.

7. The method of claim 6 further comprising the step of:
   controlling the flow rate of the fluorine into the burner in order to establish a preselected weight percentage of the fluorine present in the soot.

8. The method of claim 6 wherein the collected soot contains at least five percent fluorine by weight.

9. The method of claim 8 wherein the collected soot contains at least ten percent fluorine by weight.

10. The method of claim 1 wherein the burner produces a flame, and wherein the soot is collected at a preselected distance from the flame.

11. The method of claim 10 wherein the soot is collected at a distance greater than six inches from the flame.

12. The method of claim 10 wherein the soot is collected at a distance greater than twelve inches from the flame.

13. The method of claim 1 further wherein the soot is collected upon walls of the surface area collector.

14. The method of claim 1 further wherein the soot is collected upon floor of the surface area collector.

15. The method of claim 1 wherein the soot is collected on a substrate within the surface area collector, the method further comprising the step of:
   generating a magnetic force for directing the soot to be deposited on the substrate.

16. The method of claim 15 further comprising the step of:
   using a permanent magnet disposed proximate to the substrate for directing the soot to be deposited on the substrate.

17. The method of claim 15 further comprising the step of:
   providing an electromagnet disposed proximate to the substrate for directing the soot to be deposited on the substrate.

18. The method of claim 15 further comprising the step of:
   generating magnetic forces within the surface area collector for directing the soot to be deposited on the substrate.

19. The method of claim 18 wherein a magnetic force generator for generating the magnetic forces, said method further comprising the step of:
   cooling the magnetic force generator at least during deposition of the soot upon the substrate.

20. The method of claim 15 further comprising the step of:
   generating magnetic forces outside the surface area collector.

21. The method of claim 15 further comprising the step of:
   generating electrostatic forces for directing the soot to the substrate.

22. The method of claim 1 wherein the soot is collected on a substrate within the surface area collector, the method further comprising the steps of:
   grounding the substrate; and
   attracting the soot to the grounded substrate.

23. The method of claim 1 further comprising the steps of:
   providing a substrate with a conductive material such that the conductive material indicates an optical pathway, and
   charging the conductive material so that the soot is attracted to the conductive material of the substrate.

24. The method of claim 23 wherein the soot is collected on plurality of
   substrates within the surface area collector, the method further comprising the step of:
      conveying the plurality of substrates through the collector, said substrates receiving the generated soot.

25. The method of claim 1 wherein the soot is collected on plurality of
   substrates within the surface area collector, the method further comprising the step of:
      conveying the plurality of substrates through the collector, said substrates receiving the generated soot.

26. The method of claim 25 further comprising the step of:
   sintering the substrates that have collected the soot.

* * * * *